(12) United States Patent
Jimura et al.

(10) Patent No.: US 6,583,079 B1
(45) Date of Patent: Jun. 24, 2003

(54) CRT FRIT CAPABLE OF SEALING A CRT BULB AT A RELATIVELY LOW TEMPERATURE AND IN A SHORT TIME

(75) Inventors: Yoshitaka Jimura, Takashima-gun; Masaaki Hayashi, Otsu, both of (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/502,927

(22) Filed: Feb. 11, 2000

(30) Foreign Application Priority Data

Feb. 19, 1999 (JP) ............................. 11-041106
Aug. 13, 1999 (JP) ............................. 11-229176

(51) Int. Cl.$^7$ ..................... C03C 8/24; C03C 3/072; C03C 3/14
(52) U.S. Cl. ..................... 501/15; 501/17; 501/49; 501/75; 501/76
(58) Field of Search .................. 501/15, 17, 49, 501/75, 76

(56) References Cited

U.S. PATENT DOCUMENTS

| | | | | |
|---|---|---|---|---|
| 4,310,357 A | * | 1/1982 | Matsuura et al. | 501/15 |
| 4,405,722 A | * | 9/1983 | Kokubu et al. | 501/15 |
| 4,704,370 A | * | 11/1987 | Saki et al. | 501/15 |
| 4,710,479 A | * | 12/1987 | Yamanaka et al. | 501/15 |
| 5,346,863 A | * | 9/1994 | Hikata et al. | 501/17 |
| 5,510,300 A | * | 4/1996 | Lim et al. | 501/15 |
| 5,612,261 A | * | 3/1997 | Lim et al. | 501/32 |

FOREIGN PATENT DOCUMENTS

| | | | |
|---|---|---|---|
| JP | 59-131542 | * | 7/1984 |
| JP | 4-357132 | * | 12/1992 |
| JP | 7-69670 | * | 3/1995 |
| JP | 8-91870 | * | 4/1996 |
| JP | 8-91872 | * | 4/1996 |
| JP | 2000239042 | * | 9/2000 |

* cited by examiner

Primary Examiner—Karl Group
(74) Attorney, Agent, or Firm—Collard & Roe, P.C.

(57) ABSTRACT

A CRT frit for use in sealing a panel and a funnel of a CRT bulb comprises non-crystallizing glass powder and refractory filler powder. The non-crystallizing glass powder consists essentially of, by weight percent, 75–90% PbO, 7–20% $B_2O_3$, 0–8% ZnO, 0–5% $SiO_2$, and 0.1–8% $Al_2O_3+Fe_2O_3$. The mixing ratio of the non-crystallizing glass powder and the refractory filler powder is within a range between 95:5 and 55:45 in weight ratio. The coefficient of thermal expansion at a temperature between 30 and 250° C. is within a range between 80 and $90 \times 10^{-7}$/° C.

14 Claims, No Drawings

CRT FRIT CAPABLE OF SEALING A CRT BULB AT A RELATIVELY LOW TEMPERATURE AND IN A SHORT TIME

BACKGROUND OF THE INVENTION

This invention relates to a CRT (Cathode Ray Tube) frit and, in particular, to a CRT frit for use in sealing a panel and a funnel of a color CRT bulb.

Traditionally, a panel and a funnel of a color CRT bulb are sealed by the use of a crystallizing CRT frit comprising crystallizing glass powder of $PbO$—$B_2O_3$—$ZnO$—$SiO_2$—$BaO$ and refractory filler powder such as zircon. In a sealing step, the crystallizing CRT frit is held at a temperature between 440 and 460° C. for 30 to 60 minutes.

During an exhaust step following the sealing step, the bulb is heated again to a temperature between 350 and 400° C. Since the crystallizing CRT frit is excellent in heat resistance, no displacement of the panel and the funnel is caused in the exhaust step as a result of softening of the crystallizing CRT frit.

Following the recent improvement in the exhaust technique, it is possible to carry out exhaust by low-temperature heating. Therefore, the CRT frit is not required to have such a high heat resistance. Instead, in view of the reduction in energy cost and the improvement in productivity, it becomes important to seal the bulb at a lower temperature and in a shorter time. However, the existing CRT frit can not meet such a demand because high-temperature and long-time sealing is required as described above in order to obtain desired characteristics.

SUMMARY OF THE INVENTION

It is therefore an object of this invention to provide a CRT frit capable of sealing a panel and a funnel of a CRT bulb at a low temperature and in a short time.

According to this invention, there is provided a CRT frit which is for use in sealing a panel and a funnel of a CRT bulb and which comprises non-crystallizing glass powder and refractory filler powder, the non-crystallizing glass powder consisting essentially of, by weight percent, 75–90% PbO, 7–20% $B_2O_3$, 0–8% ZnO, 0–5% $SiO_2$, and 0.1–8% $Al_2O_3$+$Fe_2O_3$.

DESCRIPTION OF THE PREFERRED EMBODIMENTS

Now, description will be made about this invention.

A CRT frit according to this invention comprises powder of a non-crystallizing glass and powder of a refractory filler.

The non-crystallizing glass used in this invention is highly stable and is hardly devitrified. The non-crystallizing glass has a glass transition point on the order between 290 and 310° C. and a softening point on the order between 330 and 370° C. The non-crystallizing glass is excellent in flowability because it is not crystallizable. Therefore, with the CRT frit of this invention, it is possible to seal the bulb at a low temperature and in a short time. Preferably, the non-crystallizing glass consists essentially of, by weight percent, 76–88% PbO, 8–18% $B_2O_3$, 0.1–5% ZnO, 0.1–4% $SiO_2$, and 0.1–7% $Al_2O_3$+$Fe_2O_3$.

The non-crystallizing glass is classified into a first glass composition which essentially contains $Al_2O_3$ and a second glass composition which essentially contains $Fe_2O_3$.

Specifically, the first glass composition consists essentially of, by weight percent, 76–90% PbO, 8–18% $B_2O_3$, 0–5% ZnO, 0.1–3% $SiO_2$, and 0.1–3% $Al_2O_3$. The first glass composition tends to provide the glass having a relatively high softening point, as compared with the second glass composition. Therefore, displacement of the panel and the funnel resulting from softening of the glass and generation of bubbles from the glass hardly occur. In case where the exhaust temperature of the CRT bulb in an exhaust step can not sufficiently be lowered, the first glass composition is advantageous because of high stability. Description will hereinafter be made about the reason why the first glass composition is determined as mentioned above.

PbO is a component forming a network structure of the glass The content of PbO is 76–90%, preferably, 79–87%. If the content of PbO exceeds 90%, the coefficient of thermal expansion becomes too great. If the content is less than 76%, the flowability of the glass is lowered and the sealing temperature becomes excessively high.

$B_2O_3$ is a component forming the network structure of the glass. The content of $B_2O_3$ is 8–18%, preferably, 10–15%. If the content of $B_2O_3$ exceeds 18%, chemical durability is degraded to a practically unfavorable level. If the content is less then 8%, the flowability of the glass is decreased.

ZnO serves to suppress devitrification of the glass if it is added in a predetermined amount. The content is 0–5%, preferably, 1–4%. If the content of ZnO exceeds the above-mentioned range, devitrification will readily occur.

$SiO_2$ serves to stabilize the glass of the above-mentioned composition. The content is 0.1–3%, preferably, 0.2–2.5%. If the content of $SiO_2$ is more than 3%, the softening point is elevated and the sealing temperature becomes excessively high. If the content is less than 0.1%, the glass becomes unstable and will be devitrified.

$Al_2O_3$ serves to stabilize the glass of the above-mentioned composition. The content is 0.1–3%, preferably, 0.2–2.5%. If the content of $Al_2O_3$ is more than 3%, the softening point is elevated and the sealing temperature becomes excessively high. If the content is less than 0.1%, the glass becomes unstable and will be devitrified.

Furthermore, $V_2O_5$ or $Bi_2O_3$ may be contained although $V_2O_5$ or $Bi_2O_3$ is not essential. In case where the softening point is excessively elevated as a result of addition of $SiO_2$ and $Al_2O_3$ as the glass stabilizing components, addition of $V_2O_5$ or $Bi_2O_3$ is desired to control the softening point.

$V_2O_5$ serves to lower the softening point of the glass of the above-mentioned composition. The content is 0–1%, preferably, 0–0.8%. If the content of $V_2O_5$ is more than 1 %, devitrification will readily occur.

$Bi_2O_3$ is a component which serves to lower the softening point of the glass of the above-mentioned composition. The content is 0–5%, preferably, 0–4%. If the content of $Bi_2O_3$ is more than 5%, devitrification will readily occur.

As far as the glass does not become unstable, other components can be added. For example, in order to prevent the release of PbO, $TiO_2$ may be added up to 5%. In case where the glass is unstable and tends to be devitrified, $Fe_2O_3$ or CuO may be added to stabilize the glass. The content of $Fe_2O_3$ is 5% or less, preferably, 2% or less. The content of CuO is 3% or less, preferably, 1% or less.

On the other hand, the second glass composition consists essentially of, by weight percent, 75–90% PbO, 7–20% $B_2O_3$, 0–8% ZnO, 0–5% $SiO_2$, and 0.1–5% $Fe_2O_3$. Since the second glass composition contains $Fe_2O_3$, the glass is highly stable and devitrification (surface crystal precipitation) upon sealing will very hardly occur. As compared with the first glass composition, the second glass composition tends to provides the glass having a relatively low softening point. Therefore, in order to further lower the sealing temperature, the second glass composition is advantageous. Description will hereinafter be made about the reason why the second glass composition is determined as mentioned above.

PbO is a component forming a network structure of the glass. The content of PbO is 75–90%, preferably, 79–87%. If the content of PbO exceeds 90%, the coefficient of thermal expansion becomes too great. If the content is less than 75%, the flowability of the glass is lowered and the sealing temperature becomes excessively high.

$B_2O_3$ is a component forming the network structure of the glass. The content of $B_2O_3$ is 7–20%, preferably, 9–15%. If the content of $B_2O_3$ exceeds 20%, chemical durability is degraded to a practically unfavorable level. If the content is less then 7%, the flowability of the glass is degraded.

ZnO serves to suppress devitrification of the glass if it is added in a predetermined amount. The content is 0–8%, preferably, 1–5%. If the content of ZnO exceeds the above-mentioned range, devitrification will readily occur.

$SiO_2$ serves to stabilize the glass of the above-mentioned composition. The content is 0–5%, preferably, 0.2–2.5%. If the content of $SiO_2$ is more than 5%, the softening point is elevated and the sealing temperature becomes excessively high.

$Fe_2O_3$ is a component for stabilizing the glass to suppress devitrification upon sealing. In addition, $Fe_2O_3$ serves to improve weather resistance of the glass so as to prevent degradation in quality during storage, to enhance infrared absorption of the glass so as to facilitate softening and flowing of the glass, and to reduce the amount of PbO released out of the glass. The content of $Fe_2O_3$ is 0.1–5%, preferably, 0.3–4%. If the content of $Fe_2O_3$ is more than 5%, the softening point is elevated and the sealing temperature becomes excessively high. If the content is less than 0.1%, the above-mentioned effects can not be obtained. For example, the glass becomes unstable to be devitrified, or deteriorated during storage to be degraded in flowability.

In order to further stabilize the glass, $Al_2O_3$ or $Bi_2O_3$ may be contained.

The content of $Al_2O_3$ is 0–5%, preferably, 0–2.5%. If the content of $Al_2O_3$ is more than 5%, the softening point is elevated and the sealing temperature becomes excessively high.

The content of $Bi_2O_3$ is 0–6%, preferably, 0–3%. If the content of $Bi_2O_3$ is more than 6%, devitrification will readily occur.

As far as the glass does not become unstable, other components can be added. For example, in order to prevent the release of PbO, $TiO_2$ can be added up to 5%. In case where the glass is unstable and tends to be devitrified, CuO or $GeO_2$ may be added to stabilize the glass. The content of CuO is 3% or less, preferably, 1% or less. The content of $GeO_2$ is 5% or less, preferably, 2% or less. In order to lower the temperature, $Cs_2O$ and $Ag_2O$ may be added up to 1% and up to 0.8%, respectively. If the content of $Cs_2O$ exceeds 1%, the glass is deteriorated during storage to degrade the flowability. If the content of $Ag_2O$ exceeds 0.8%, the production cost is unfavorably increased.

As the refractory filler powder in this invention, use of alumina ($Al_2O_3$) or zircon ($ZrSiO_4$) is most preferable. Besides, use may be made of cordierite ($2MgO \cdot 2Al_2O_3 \cdot 5SiO_2$), lead titanate ($PbTiO_3$), silica glass (a-$SiO_2$), willemite ($2ZnO \cdot SiO_2$), and tin oxide ($SnO_2$). These materials may be used alone or in combination.

In this invention, the ratio of the non-crystallizing glass powder and the refractory filler powder is between 95:5 and 55:45, preferably, between 91:9 and 70:30 in weight ratio.

The reason why the ratio of the non-crystallizing glass powder and the refractory filler powder determined as mentioned above is as follows. If the content of the glass powder is smaller than the above-mentioned range, the flowability of the frit is insufficient. In this event, it is impossible to obtain an excellent sealing configuration and to form a compact sealing layer. On the other hand, if the content of the refractory filler powder is smaller than the above-mentioned range, the frit and the bulb does not match in coefficient of thermal expansion and the mechanical strength is insufficient.

In the CRT frit of this invention, the coefficient of thermal expansion at a temperature between 30 and 250° C. is preferably adjusted to a range between $80 \times 10^{-7}$/° C. and $90 \times 10^{-7}$/° C. If the coefficient of thermal expansion of the frit is within the above-mentioned range, stress of an appropriate level (450–1000 psi) is produced in the CRT bulb so that a high sealing strength is achieved. Beyond the above-mentioned range, abnormal stress is produced so that a frit seal portion, the panel, and the funnel will readily be damaged.

Since the CRT frit of this invention having the above-mentioned structure is not crystallized, it is unnecessary to consider crystallization characteristics upon sealing. Therefore, the sealing condition of the CRT bulb can be selected with a relatively large degree of freedom. Specifically, the sealing temperature is appropriately selected between 410 and 430° C. while a holding time is appropriately selected between 5 and 20 minutes. As a most preferable sealing condition, the sealing temperature is 420° C. and the holding time is 10 minutes. Depending upon the size and the shape of the CRT panel, the bulb may easily be broken due to the stress produced during sealing. In order to avoid such stress, the rate of elevation or drop of the temperature is moderated.

EXAMPLES

Hereinafter, the CRT frit of this invention will be described in detail in conjunction with specific examples.

Tables 1 and 2 show non-crystallizing glass powder (samples A–K) used in this invention. The sample L is a reference example showing a glass used in an existing crystallizing frit.

TABLE 1

|  | A | B | C | D | E | F | G |
|---|---|---|---|---|---|---|---|
| Glass Composition (wt %) |  |  |  |  |  |  |  |
| PbO | 81.0 | 82.3 | 85.2 | 84.8 | 82.9 | 84.6 | 85.1 |
| $B_2O_3$ | 11.7 | 12.0 | 11.5 | 13.0 | 11.5 | 11.7 | 12.0 |
| ZnO | 2.5 | 0.1 | 1.5 | — | 3.5 | 1.7 | 1.3 |
| $SiO_2$ | 1.0 | 0.8 | 0.5 | 1.2 | 0.8 | 0.8 | 0.5 |
| $Al_2O_3$ | 0.8 | 0.5 | 0.2 | 1.0 | 0.2 | 0.5 | 0.3 |
| $V_2O_5$ | 0.5 | 0.3 | 0.1 | — | — | — | — |
| $Bi_2O_5$ | 2.5 | 4.0 | 1.0 | — | 0.6 | — | — |
| $Fe_2O_3$ | — | — | — | — | 0.5 | — | 0.3 |
| CuO | — | — | — | — | — | 0.7 | 0.5 |
| Glass Transition Point (° C.) | 300 | 296 | 305 | 310 | 306 | 307 | 310 |
| Softening Point (° C.) | 352 | 338 | 359 | 366 | 360 | 358 | 362 |
| Crystallization Temperature (° C.) | — | — | — | — | — | — | — |
| Coefficient of Thermal Expansion ($\times 10^{-7}$/° C.) | 119 | 116 | 115 | 113 | 114 | 114 | 113 |

TABLE 2

|  | H | I | J | K | L |
|---|---|---|---|---|---|
| Glass Composition (wt %) | | | | | |
| PbO | 83.5 | 83.0 | 80.5 | 83.5 | 74.8 |
| $B_2O_3$ | 10.0 | 9.0 | 13.0 | 11.5 | 8.9 |
| ZnO | 3.0 | 1.0 | 2.0 | 3.5 | 12.2 |
| $SiO_2$ | 1.0 | 1.0 | 3.0 | 0.8 | 2.1 |
| $Al_2O_3$ | 0.5 | 2.0 | — | — | — |
| $Fe_2O_3$ | 2.0 | 4.0 | 1.0 | 0.7 | — |
| BaO | — | — | — | — | 2.0 |
| Glass Transition Point (° C.) | 299 | 304 | 305 | 300 | 321 |
| Softening Point (° C.) | 348 | 352 | 359 | 350 | 398 |
| Crystallization Temperature (° C.) | — | — | — | — | 430 |
| Coefficient of Thermal Expansion ($\times 10^{-7}$/° C.) | 114 | 114 | 112 | 115 | 106 |

Each sample was prepared as follows. At first, lead oxide, boric acid, zinc oxide, silicon dioxide, aluminum oxide, vanadium pentoxide, bismuth oxide, iron oxide, copper oxide, and barium carbonate were mixed in the ratio given in Table 1 or 2, put in a platinum crucible, melted at 800–850° C. for one hour to be vitrified, and molded into a film. The film was pulverized by a ball mill and classified through a 100-mesh (JIS (Japanese Industrial Standard)) sieve to obtain a glass powder sample having an average particle size between 5 and 6 $\mu$m.

The sample thus obtained was measured for the glass transition point, the softening point, and the crystallization temperature by the use of a differential thermal analysis (DTA) apparatus. Herein, the crystallization temperature is a temperature at which heat is generated from the glass following the precipitation of crystals. To measure the coefficient of thermal expansion of the resultant glass using each of the samples A to L, the resultant glass was ground into a size of 40×4 mm$\phi$. Then, the coefficient of thermal expansion at a temperature between 30 and 250° C. was measured by the use of a dilatometer.

As a result, the samples A to K had glass transition points between 296 and 310° C. and the softening points between 338 and 366° C. The coefficients of thermal expansion at a temperature between 30 and 250° C. were between 112× $10^{-7}$/° C. to 119×$10^{-7}$/° C. In each sample, the crystallization temperature was not confirmed. On the other hand, the sample L used in the existing frit had the transition point of 321° C. and the softening point of 398° C. The coefficient of thermal expansion at a temperature between 30 and 250° C. was 106×$10^{-7}$/° C. The crystallization temperature was 430° C.

Tables 3 and 4 show examples (Samples Nos. 1–12) of this invention prepared by mixing the Samples A to K and the refractory filler powder. The samples Nos. 13 and 14 are reference examples showing an existing crystallizing frit prepared by mixing the sample L and zircon powder. In the refractory filler powder, a 150-mesh pass product and a 200-mesh pass product were used as zircon and alumina, respectively.

TABLE 3

| | | Examples of This Invention | | | | | | |
|---|---|---|---|---|---|---|---|---|
| | | 1 | 2 | 3 | 4 | 5 | 6 | 7 |
| Glass Powder (wt %) | | A 90.0 | B 78.0 | C 75.5 | D 77.5 | D 78.5 | E 76.0 | F 76.0 |
| Filler Powder (wt %) | | zircon 10.0 | zircon 10.0 alumina 12.0 | zircon 16.0 alumina 8.5 | zircon 12.2 alumina 10.3 | zircon 12.5 alumina 9.0 | zircon 15.0 alumina 9.0 | zircon 14.0 alumina 10.0 |
| Sealing Condition | (° C.) | 420 | 420 | 420 | 420 | 420 | 420 | 420 |
| | (min) | 10 | 10 | 10 | 10 | 10 | 10 | 10 |
| Coefficient of Thermal Expansion ($10^{-7}$/° C.) | | 90 | 86 | 84 | 86 | 89 | 85 | 86 |
| Specific Gravity (g/cc) | | 6.5 | 6.0 | 6.0 | 5.9 | 6.0 | 6.0 | 6.0 |
| Flow Diameter (mm) | | 25.2 | 24.5 | 23.7 | 22.9 | 25.5 | 23.5 | 23.2 |
| Shape of Bulb Seal | | good | good | good | good | good | good | good |
| Water-Pressure Strength (kg/cm$^2$) | | ≧6.0 | ≧6.0 | ≧6.0 | ≧6.0 | ≧6.0 | ≧6.0 | ≧6.0 |

TABLE 4

| | | Examples of This Invention | | | | | Reference Examples | |
|---|---|---|---|---|---|---|---|---|
| | | 8 | 9 | 10 | 11 | 12 | 13 | 14 |
| Glass Powder (wt %) | | G 78.0 | H 90.0 | I 78.0 | J 77.0 | K 75.5 | L 99.0 | L 99.0 |
| Filler Powder (wt %) | | zircon 10.0 alumina 12.0 | zircon 10.0 | zircon 10.0 alumina 12.0 | zircon 17.0 alumina 6.0 | zircon 16.0 alumina 8.5 | zircon 1.0 | zircon 1.0 |
| Sealing Condition | (° C.) | 420 | 420 | 420 | 420 | 420 | 420 | 440 |
| | (min) | 10 | 10 | 10 | 10 | 10 | 10 | 40 |
| Coefficient of Thermal Expansion ($10^{-7}$/° C.) | | 84 | 90 | 86 | 83 | 84 | 106 | 99 |
| Specific Gravity (g/cc) | | 6.0 | 6.3 | 6.0 | 6.0 | 6.0 | 6.5 | 6.5 |

TABLE 4-continued

| | Examples of This Invention | | | | | Reference Examples | |
|---|---|---|---|---|---|---|---|
| | 8 | 9 | 10 | 11 | 12 | 13 | 14 |
| Flow Diameter (mm) | 23.0 | 25.0 | 24.3 | 24.0 | 23.5 | 21.0 | 23.2 |
| Shape of Bulb Seal | good | good | good | good | good | not good | good |
| Water-Pressure Strength (kg/cm$^2$) | ≧6.0 | ≧6.0 | ≧6.0 | ≧6.0 | ≧6.0 | — | ≧6.0 |

Each of the samples was evaluated for various characteristics.

As seen from the tables, in each of the samples Nos. 1 through 12 as the embodiments of this invention, the coefficient of thermal expansion at a temperature between 30 and 250° C. was within a range between $83 \times 10^{-7}/°$ C. and $90 \times 10^{-7}/°$ C. and the flow diameter had a value between 22.9 and 25.5 mm. Then, a 29-inch color CRT bulb was sealed by the use of each sample under the sealing condition shown in the tables and the seal configuration was evaluated. As a result, an appropriate sealing thickness between 0.15 and 0.3 mm was obtained. The inner and the outer surfaces of the bulb were appropriately coated with the frit. Thus, the seal configuration was excellent without insufficiency of flow and occurrence of downward drooping. Furthermore, the bulb was tested for the water-pressure strength. As a result, the water-pressure strength was not smaller than 6.0 kg/cm$^2$ for all of these samples.

On the other hand, in the reference examples, the sample No. 14 under the sealing condition of 440° C. and 40 minutes exhibited the characteristics substantially equivalent to those of the examples of this invention. However, in the sample No. 13 under the sealing condition of 420° C. and 10 minutes, the flow diameter was 21.0 mm and the glass did not sufficiently flow. Because of absence of precipitation of crystals, the coefficient of thermal expansion was as great as $106 \times 10^{-7}/°$ C. It is therefore assumed that a panel glass had abnormal stress. Then, a CRT bulb was actually sealed and a frit seal portion was observed. As a result, the seal edge was not sufficiently coated with the frit. Thus, the seal configuration was not good.

The coefficient of thermal expansion was measured as follows. The frit was fired under each of the sealing conditions shown in the tables and ground into a size of 40×4 mmφ. Then, measurement was carried out by the use of a dilatometer. The specific gravity was calculated from a mixing ratio with reference to the specific gravities of the glass and the filler. The flow diameter was measured as follows. Powder of each sample in an amount corresponding to the specific gravity was pressed into a cylindrical body of 20 mmφ. The cylindrical body was put on the panel glass of the CRT and fired under each of the sealing conditions shown in the tables to obtain a fired cylindrical body which is called a flow button. Thereafter, the surface of the flow button was observed by the use of a 50-power optical microscope and the diameter of the flow button was measured by a caliper. The seal configuration was evaluated as follows. The panel and the funnel of the 29-inch color CRT were sealed by the use of each sample under each of the sealing conditions shown in the tables. Then, the sealing thickness was measured. Visual observation was performed for the state of the frit covering the seal edge and the presence/absence of drooping of the frit. The water-pressure strength was measured as follows. The 29-inch color CRT bulb sealed under each of the sealing conditions shown in the tables was put in a water tank. The water pressure outside of the bulb was gradually elevated until the bulb was broken. The pressure at which the bulb was broken was measured as the water-pressure strength. It is generally understood that the water-pressure strength not smaller than 3.5 kg/cm$^2$ is practically acceptable.

As described above, with the CRT frit of this invention, the panel and the funnel of the color CRT bulb can be sealed at a low temperature and in a short time as compared with the existing crystallizing frit. It is therefore possible to save the energy cost and to improve the productivity.

What is claimed is:

1. A CRT frit for use in sealing a panel and a funnel of a CRT bulb and which comprises non-crystallizing glass powder and refractory filler powder, said non-crystallizing glass powder consisting essentially of, by weight, 75–90% PbO, 11.5–20% B$_2$O$_3$, 0–8% ZnO, 0–2.5% SiO$_2$, and 0.1–8% Al$_2$O$_3$+Fe$_2$O$_3$, said refractory filler powder comprising alumina powder.

2. A CRT frit as claimed in claim 1, wherein said non-crystallizing glass powder consists essentially of, by weight 76–90% PbO, 11.5–18% B$_2$O$_3$, 0–5% ZnO, 0.1–2.5% SiO$_2$, and 0.1–3% Al$_2$O$_3$.

3. A CRT frit for use in sealing a panel and a funnel of a CRT bulb which comprises non-crystallizing glass powder and a refractory filler powder, said non-crystallizing glass powder consisting essentially of, by weight percent, 75–90% PbO, 11.5–20% B$_2$O$_3$, 0–8% ZnO, 0–5% SiO$_2$, and 0.1–5% Fe$_2$O$_3$.

4. A CRT frit as claimed in claim 1, wherein the mixing ratio of said non-crystallizing glass powder and said refractory filler powder is within a range between 95:5 and 55:45 in weight ratio.

5. A CRT frit as claimed in claim 1, wherein the coefficient of thermal expansion at a temperature between 30 and 250° C. is within a range between 80 and $90 \times 10^{-7}/°$ C.

6. A CRT frit as claimed in claim 1, wherein said refractory filler powder comprises alumina powder and zircon powder.

7. A CRT frit as claimed in claim 3, wherein said refractory filler powder comprises alumina powder.

8. A CRT frit as claimed in claim 3, wherein the mixing ratio of said non-crystallizing glass powder and said refractory filler powder is within a range between 95:5 and 55:45 in weight ratio.

9. A CRT frit as claimed in claim 3, wherein the coefficient of thermal expansion at a temperature between 30 and 250° C. is within a range between 80 and $90 \times 10^{-7}/°$ C.

10. A CRT frit as claimed in claim 3, wherein said refractory filler powder comprises alumina powder and zircon powder.

11. A CRT frit for use in sealing a panel and a funnel of a CRT bulb and which comprises non-crystallizing glass powder and refractory filler powder, wherein the mixing ratio of said non-crystallizing glass powder and said refractory filler powder is within a range between 95:5 and 55:45 in weight ratio, the coefficient of thermal expansion at a temperature between 30 and 250° C. being within a range between 80 and $90\times10^{-7}/°$ C., said non-crystallizing glass powder consisting essentially of, by weight, 76–90% PbO, 11.5–18% $B_2O_3$, 0–5% ZnO, 0.1–2.5% $SiO_2$, and 0.1–3% $Al_2O_3$, said refractory filler powder comprising alumina powder.

12. A CRT frit as claimed in claim 11, wherein said refractory filler powder comprises alumina powder and zircon powder.

13. A CRT frit for use in sealing a panel and a funnel of a CRT bulb and which comprises non-crystallizing glass powder and refractory filler powder, wherein the mixing ratio of said non-crystallizing glass powder and said refractory filler powder is within a range between 95:5 and 55:45 in weight ratio, the coefficient of thermal expansion at a temperature between 30 and 250° C. being within a range between 80 and $90\times10^{-7}/°$ C., said non-crystallizing glass powder consisting essentially of, by weight, 75–90% PbO, 11.5–20% $B_2O_3$, 0–8% ZnO, 0–5% $SiO_2$, and 0.1–5% $Fe_2O_3$, said refractory filler powder comprising alumina powder.

14. A CRT frit as claimed in claim 13, wherein said refractory filler powder comprises alumina powder and zircon powder.

* * * * *